US008455609B2

(12) United States Patent
Ricci et al.

(10) Patent No.: US 8,455,609 B2
(45) Date of Patent: Jun. 4, 2013

(54) CASTABLE POLYUREA FORMULATION FOR GOLF BALL COVERS

(75) Inventors: Shawn Ricci, Fairhaven, MA (US); Randy Petrichko, Fairhaven, MA (US); Brian Comeau, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 424 days.

(21) Appl. No.: 12/191,897

(22) Filed: Aug. 14, 2008

(65) Prior Publication Data

US 2009/0011868 A1 Jan. 8, 2009

(51) Int. Cl.
*A63B 37/12* (2006.01)
*A63B 37/00* (2006.01)
*C08G 18/50* (2006.01)

(52) U.S. Cl.
USPC ............... 528/61; 528/60; 528/68; 528/76; 473/374; 473/378

(58) Field of Classification Search
None
See application file for complete search history.

(56) References Cited

U.S. PATENT DOCUMENTS

| 3,147,324 | A | 9/1964 | Ward ............................. 264/254 |
| 3,264,272 | A | 8/1966 | Rees ............................ 260/78.5 |
| 3,454,280 | A | 7/1969 | Harrison et al. ............... 273/235 |
| 3,819,768 | A | 6/1974 | Molitor ....................... 260/897 B |
| 3,940,145 | A | 2/1976 | Gentiluomo ................... 273/218 |
| 4,123,061 | A | 10/1978 | Dusbiber ....................... 273/220 |
| 4,323,247 | A | 4/1982 | Keches et al. ............. 273/235 R |
| 4,431,193 | A | 2/1984 | Nesbitt ..................... 273/235 R |
| 4,526,375 | A | 7/1985 | Nakade ..................... 273/235 R |
| 4,560,168 | A | 12/1985 | Aoyama ..................... 273/232 |
| 4,884,814 | A | 12/1989 | Sullivan ................... 273/235 R |
| 4,911,451 | A | 3/1990 | Sullivan et al. ........... 273/235 R |
| 4,925,193 | A | 5/1990 | Melvin et al. ............... 273/232 |
| 4,956,438 | A | 9/1990 | Ruetman et al. ............... 528/60 |
| 4,960,281 | A | 10/1990 | Aoyama ....................... 273/232 |
| 5,006,297 | A | 4/1991 | Brown et al. ................. 264/234 |
| 5,066,762 | A | 11/1991 | Ohbuchi et al. ................ 528/85 |
| 5,071,578 | A | 12/1991 | Ohkubo et al. ............. 252/62.54 |
| 5,248,878 | A | 9/1993 | Ihara ........................ 219/121.69 |
| 5,249,804 | A | 10/1993 | Sanchez ........................ 373/232 |
| 5,252,652 | A | 10/1993 | Egashira et al. ............... 524/392 |
| 5,316,730 | A | 5/1994 | Blake et al. .................... 422/73 |
| 5,334,673 | A | 8/1994 | Wu ........................... 273/235 R |
| 5,403,453 | A | 4/1995 | Roth et al. .................... 204/164 |
| 5,456,972 | A | 10/1995 | Roth et al. .................... 428/224 |
| 5,484,870 | A | 1/1996 | Wu ................................ 528/28 |
| 5,562,552 | A | 10/1996 | Thurman ..................... 473/379 |
| 5,575,477 | A | 11/1996 | Hwang ........................ 473/379 |
| 5,605,968 | A | 2/1997 | Egashira et al. ............... 525/221 |
| 5,661,207 | A | 8/1997 | Carlson et al. ................ 524/414 |
| 5,688,191 | A | 11/1997 | Cavallaro et al. ............. 473/373 |
| 5,688,595 | A | 11/1997 | Yamagishi et al. ............ 428/375 |
| 5,692,974 | A | 12/1997 | Wu et al. ..................... 473/377 |
| 5,697,856 | A | 12/1997 | Moriyama et al. ............ 473/374 |
| 5,711,723 | A | 1/1998 | Hiraoka et al. ............... 473/374 |
| 5,713,801 | A | 2/1998 | Aoyama ....................... 473/354 |
| 5,733,428 | A | 3/1998 | Calabria et al. ................ 264/134 |
| 5,776,012 | A | 7/1998 | Moriyama et al. ............ 473/372 |
| 5,779,561 | A | 7/1998 | Sullivan ....................... 473/373 |
| 5,779,563 | A | 7/1998 | Yamagishi et al. ............ 473/371 |
| 5,792,008 | A | 8/1998 | Kakiuchi ...................... 473/354 |
| 5,800,286 | A | 9/1998 | Kakiuchi et al. .............. 473/365 |
| 5,803,831 | A | 9/1998 | Sullivan et al. ............... 473/374 |
| 5,816,944 | A | 10/1998 | Asakura et al. ............... 473/372 |
| 5,820,488 | A | 10/1998 | Sullivan et al. ............... 473/374 |
| 5,820,491 | A | 10/1998 | Hatch et al. .................. 473/378 |
| 5,849,168 | A | 12/1998 | Lutz ............................ 264/755 |
| 5,872,185 | A | 2/1999 | Ichikawa et al. ................ 525/93 |
| 5,877,264 | A | 3/1999 | Logothetis et al. ............ 526/86 |
| 5,885,172 | A | 3/1999 | Hebert et al. ................. 473/354 |
| 5,908,358 | A | 6/1999 | Wu ............................. 473/378 |
| 5,908,699 | A | 6/1999 | Kim ............................ 428/408 |
| 5,919,100 | A | 7/1999 | Boehm et al. ................. 473/354 |
| 5,919,101 | A | 7/1999 | Yokota et al. ................. 473/374 |
| 5,929,171 | A | 7/1999 | Sano et al. .................... 525/261 |
| 5,929,189 | A | 7/1999 | Ichikawa et al. ............... 528/76 |
| 5,957,787 | A | 9/1999 | Hwang ........................ 473/379 |
| 5,965,669 | A | 10/1999 | Cavallaro et al. ............. 525/221 |
| 5,977,264 | A | 11/1999 | Ichikawa et al. ........... 525/329.9 |
| 5,981,654 | A | 11/1999 | Rajagopalan ................... 525/66 |
| 5,981,658 | A | 11/1999 | Rajagopalan et al. .......... 525/72 |
| 5,989,136 | A | 11/1999 | Renard et al. ................ 473/376 |
| 5,993,968 | A | 11/1999 | Umezawa .................... 428/407 |
| 5,994,472 | A | 11/1999 | Egashira et al. .............. 525/221 |
| 6,056,842 | A | 5/2000 | Dalton et al. ................. 156/243 |

(Continued)

FOREIGN PATENT DOCUMENTS

WO WO 01/43832 6/2001

OTHER PUBLICATIONS

U.S. Appl. No. 09/717,136, filed Nov. 22, 2000 entitled "Method of Making Golf Balls".
U.S. Appl. No. 09/442,845, filed Nov. 18, 1999 entitled "Mold for a Golf Ball" (Japanese Abstract submiited).
Grant & Hackh's Chemical Dictionary 5th Edition p. 118, Feb. 1990.
John A. Schey, Introduction to Manufacturing Processes 410 (Anne Duffy, ed., McGraw-Hill 2d ed. 1987)(1977).

(Continued)

*Primary Examiner* — David Buttner (74) *Attorney, Agent, or Firm* — Smith, Gambrell & Russell, LLP (57) ABSTRACT

Golf balls having improved cut and shear resistance that include covers and/or other layers formed from polyurea compositions formed with at least one amine-terminated polytetramethylene ether glycol homopolymer, at least one amine-terminated copolymer of polytetramethylene ether glycol and polyalkylene glycol. The amine-terminated polytetramethylene ether glycol homopolymer or amine-terminated copolymer of polytetramethylene ether glycol and polyalkylene glycol may be used as the isocyanate-reactive in the prepolymer and/or the curing agent.

13 Claims, 2 Drawing Sheets

U.S. PATENT DOCUMENTS

| | | | | |
|---|---|---|---|---|
| 6,075,223 | A | 6/2000 | Harrison | 219/121.85 |
| 6,083,119 | A | 7/2000 | Sullivan et al. | 473/354 |
| 6,099,415 | A | 8/2000 | Lutz | 473/357 |
| 6,103,822 | A | 8/2000 | Housel et al. | 524/840 |
| 6,117,024 | A | 9/2000 | Dewanjee | 473/351 |
| 6,120,392 | A | 9/2000 | Kashiwagi et al. | 473/374 |
| 6,121,357 | A | 9/2000 | Yokota | 524/406 |
| 6,126,558 | A | 10/2000 | Higuchi et al. | 473/374 |
| 6,129,640 | A | 10/2000 | Higuchi et al. | 473/374 |
| 6,129,881 | A | 10/2000 | Puniello | 264/278 |
| 6,135,898 | A | 10/2000 | Higuchi et al. | 473/374 |
| 6,149,535 | A | 11/2000 | Bissonnette et al. | 473/354 |
| 6,150,462 | A | 11/2000 | Rajagopalan et al. | 525/74 |
| 6,162,135 | A | 12/2000 | Bulpett et al. | 473/373 |
| 6,174,247 | B1 | 1/2001 | Higuchi et al. | 473/374 |
| 6,180,040 | B1 | 1/2001 | Ladd et al. | 264/248 |
| 6,180,722 | B1 | 1/2001 | Dalton et al. | 525/193 |
| 6,184,301 | B1 | 2/2001 | Shindo et al. | 525/261 |
| 6,187,864 | B1 | 2/2001 | Rajagopalan | 525/183 |
| 6,190,268 | B1 | 2/2001 | Dewanjee | 473/370 |
| 6,207,784 | B1 | 3/2001 | Rajagopalan | 528/71 |
| 6,210,292 | B1 | 4/2001 | Higuchi et al. | 473/374 |
| 6,210,294 | B1 | 4/2001 | Wu | 473/372 |
| 6,213,896 | B1 | 4/2001 | Higuchi et al. | 473/374 |
| 6,213,898 | B1 | 4/2001 | Ogg | 473/383 |
| 6,231,460 | B1 | 5/2001 | Higuchi et al. | 473/374 |
| 6,235,230 | B1 | 5/2001 | Puniello | 264/278 |
| 6,241,622 | B1 | 6/2001 | Gobush et al. | 473/199 |
| 6,241,625 | B1 | 6/2001 | Yokota et al. | 473/373 |
| 6,244,978 | B1 | 6/2001 | Higuchi et al. | 473/374 |
| 6,248,028 | B1 | 6/2001 | Higuchi et al. | 473/374 |
| 6,248,804 | B1 | 6/2001 | Lutz | 523/160 |
| 6,267,692 | B1 | 7/2001 | Higuchi et al. | 473/365 |
| 6,267,694 | B1 | 7/2001 | Higuchi et al. | 473/374 |
| 6,286,364 | B1 | 9/2001 | Aoyama et al. | 73/65.03 |
| 6,287,218 | B1 | 9/2001 | Ohama | 473/377 |
| 6,290,614 | B1 | 9/2001 | Kennedy, III et al. | 473/378 |
| 6,290,615 | B1 | 9/2001 | Ogg | 473/378 |
| 6,291,592 | B1 | 9/2001 | Bulpett et al. | 525/248 |
| 6,299,551 | B1 | 10/2001 | Higuchi et al. | 473/374 |
| 6,309,313 | B1 | 10/2001 | Peter | 473/378 |
| 6,315,915 | B1 | 11/2001 | Hebert et al. | 216/67 |
| 6,338,684 | B1 | 1/2002 | Winfield et al. | 473/378 |
| 6,358,161 | B1 | 3/2002 | Aoyama | 473/383 |
| 6,371,870 | B1 | 4/2002 | Calabria et al. | 473/374 |
| 6,379,138 | B1 | 4/2002 | Puniello et al. | 425/116 |
| 6,383,092 | B1 | 5/2002 | Ogg | 473/378 |
| 6,386,992 | B1 | 5/2002 | Harris et al. | 473/371 |
| 6,409,615 | B1 | 6/2002 | McGuire et al. | 473/383 |
| 6,435,986 | B1 | 8/2002 | Wu et al. | 473/378 |
| 6,458,895 | B1 | 10/2002 | Wrigley et al. | 525/248 |
| 6,462,303 | B1 | 10/2002 | Brown | 219/121.69 |
| 6,465,578 | B1 | 10/2002 | Bissonnette et al. | 525/261 |
| 6,476,130 | B1 | 11/2002 | Rajagopalan et al. | 525/74 |
| 6,488,591 | B1 | 12/2002 | Gobush et al. | 473/199 |
| 6,500,073 | B1 | 12/2002 | Gobush et al. | 473/199 |
| 6,500,495 | B2 | 12/2002 | Lutz | 427/500 |
| 6,503,156 | B1 | 1/2003 | Sullivan | 473/374 |
| 6,506,130 | B2 | 1/2003 | Sullivan | 473/374 |
| 6,582,326 | B2 | 6/2003 | Wu et al. | 473/378 |
| 6,610,812 | B1 | 8/2003 | Wu et al. | 528/60 |
| 6,629,898 | B2 | 10/2003 | Nardacci | 473/373 |
| 6,705,959 | B2 | 3/2004 | Morgan et al. | 473/378 |
| 6,796,912 | B2 | 9/2004 | Dalton et al. | 473/383 |
| 6,800,690 | B2 | 10/2004 | Rajagopalan et al. | 525/183 |
| 6,835,794 | B2 | 12/2004 | Wu et al. | 528/64 |
| 6,877,974 | B2 | 4/2005 | Puniello et al. | 425/116 |
| 6,935,240 | B2 | 8/2005 | Gosetti | 101/490 |
| 6,964,621 | B2 | 11/2005 | Bulpett et al. | 473/351 |
| 6,998,445 | B2 | 2/2006 | Ladd et al. | 525/261 |
| 7,011,767 | B2 | 3/2006 | Gasper et al. | 252/182.24 |
| 7,041,769 | B2 | 5/2006 | Wu et al. | 528/61 |
| 7,186,777 | B2 | 3/2007 | Wu et al. | 524/765 |
| 7,202,303 | B2 | 4/2007 | Wu et al. | 525/92 C |
| 7,211,624 | B2 | 5/2007 | Wu et al. | 525/92 C |
| 7,214,738 | B2 | 5/2007 | Wu et al. | 525/92 C |
| 7,217,764 | B2 | 5/2007 | Wu et al. | 525/92 C |
| 7,427,243 | B2 | 9/2008 | Sullivan | 473/378 |
| 7,649,072 | B2 | 1/2010 | Wu et al. | 528/61 |
| 7,786,212 | B2 | 8/2010 | Wu et al. | 524/839 |
| 7,888,449 | B2 | 2/2011 | Wu et al. | 528/61 |
| 8,026,334 | B2 | 9/2011 | Wu et al. | 528/61 |
| 2001/0009310 | A1 | 7/2001 | Hebert | |
| 2001/0011045 | A1 | 8/2001 | Takemura | |
| 2001/0016522 | A1 | 8/2001 | Watanabe | |
| 2001/0018374 | A1 | 8/2001 | Ichikawa | |
| 2001/0018375 | A1 | 8/2001 | Hayashi | |
| 2001/0019971 | A1 | 9/2001 | Hayashi | |
| 2001/0031669 | A1 | 10/2001 | Ohama | |
| 2001/0031673 | A1 | 10/2001 | Watanabe | |
| 2002/0025862 | A1 | 2/2002 | Sullivan | |
| 2002/0028885 | A1 | 3/2002 | Sullivan | |
| 2002/0082358 | A1 | 6/2002 | Ohira | |
| 2002/0160859 | A1 | 10/2002 | Morgan | |
| 2002/0160862 | A1 | 10/2002 | Morgan | |
| 2003/0032503 | A1 | 2/2003 | Yokota | |
| 2003/0078348 | A1 | 4/2003 | Rajagopalan | |
| 2003/0106442 | A1 | 6/2003 | Gosetti | |
| 2003/0114255 | A1 | 6/2003 | Dalton | |
| 2003/0119989 | A1 | 6/2003 | Ladd | |
| 2003/0158001 | A1 | 8/2003 | Morgan | |
| 2003/0203771 | A1 | 10/2003 | Rosenberg | |
| 2003/0212240 | A1 | 11/2003 | Wu | |
| 2003/0220464 | A1* | 11/2003 | Wu et al. | 528/61 |
| 2003/0232666 | A1 | 12/2003 | Sullivan | |
| 2004/0225102 | A1* | 11/2004 | Rajagopalan et al. | 528/61 |
| 2004/0254298 | A1 | 12/2004 | Kim | |
| 2005/0009638 | A1 | 1/2005 | Wu | |
| 2005/0009642 | A1 | 1/2005 | Wu | |
| 2005/0202904 | A1 | 9/2005 | Takesue | |
| 2005/0228146 | A1* | 10/2005 | Wu et al. | 525/473 |
| 2005/0272529 | A1* | 12/2005 | Wu | 473/351 |
| 2006/0014918 | A1* | 1/2006 | Rajagopalan | 528/61 |
| 2009/0029802 | A1* | 1/2009 | Rajagopalan | 473/374 |

OTHER PUBLICATIONS

Non-Final Office Action dated Oct. 2, 2007 of corresponding U.S. Appl. No. 11/785,496.
Notice of Allowance dated Jun. 2, 2008 of corresponding U.S. Appl. No. 11/785,496.
Non-Final Office Action dated Jun. 22, 2006 of corresponding U.S. Appl. No. 10/900,468.
Notice of Allowance dated Jan. 5, 2007 of corresponding U.S. Appl. No. 10/900,468.
Non-Final Office Action dated Feb. 25, 2005 of corresponding U.S. Appl. No. 10/409,092.
Notice of Allowance dated May 19, 2005 of corresponding U.S. Appl. No. 10/409,092.
Final Office Action dated Jun. 8, 2004 of corresponding U.S. Appl. No. 10/228,311.
Non-Final Office Action dated Dec. 9, 2003 of corresponding U.S. Appl. No. 10/228,311.
Non-Final Office Action dated Apr. 9, 2010 of corresponding U.S. Appl. No. 12/689,698.
Final Office Action dated Mar. 23, 2010 of corresponding U.S. Appl. No. 12/371,387.
Non-Final Office Action dated Sep. 15, 2009 of corresponding U.S. Appl. No. 12/371,387.
Non-Final Office Action dated Jun. 21, 2011 of corresponding U.S. Appl. No. 13/026,743.
Notice of Allowance dated Oct. 18, 2010 of corresponding U.S. Appl. No. 12/689,698.
Final Office Action dated Mar. 22, 2011 of corresponding U.S. Appl. No. 12/850,335.
Non-Final Office Action dated Apr. 17, 2012 of corresponding U.S. Appl. No. 13/246,334.
Notice of Allowance dated Apr. 3, 2012 of corresponding U.S. Appl. No. 13/026,743.
Final Office Action dated Sep. 21, 2012 of corresponding U.S. Appl. No. 13/246,334.

* cited by examiner

CASTABLE POLYUREA FORMULATION FOR GOLF BALL COVERS

FIELD OF THE INVENTION

The invention relates to castable polyurea compositions for use in golf balls. In particular, the present invention is directed to golf balls having covers and/or other layers formed from the reaction product of a prepolymer formed from an isocyanate and an amine-terminated polytetramethylene ether glycol and an amine-terminated curing agent. In another aspect of the invention, the present invention is directed to golf balls having covers and/or other layers formed from the reaction product of a polyurea prepolymer cured with an amine-terminated polytetramethylene ether glycol. In either scenario, the amine-terminated polytetramethylene ether glycol is terminated with secondary amines. In addition, the amine-terminated polytetramethylene ether glycol may be a copolymer with polypropylene glycol, wherein the polytetramethylene ether glycol is end-capped with one or more propylene glycol units to form the copolymer.

BACKGROUND OF THE INVENTION

Golf equipment, i.e., clubs and balls, are formed from a variety of compositions. For example, golf ball covers are formed from a variety of materials, including balata and ionomer resins. Balata is a natural or synthetic trans-polyisoprene rubber. Balata covered balls are favored by more highly skilled golfers because the softness of the cover allows the player to achieve spin rates sufficient to more precisely control ball direction and distance, particularly on shorter shots.

However, balata covered balls are easily damaged, and thus lack the durability required by the average golfer. Accordingly, alternative cover compositions have been developed in an attempt to provide balls with spin rates and a feel approaching those of balata covered balls, while also providing a golf ball with a higher durability and overall distance.

Ionomer resins have, to a large extent, replaced balata as a cover material. Chemically, ionomer resins are a copolymer of an olefin and an α, β-ethylenically-unsaturated carboxylic acid having 10 to 90 percent of the carboxylic acid groups neutralized by a metal ion, as disclosed in U.S. Pat. No. 3,264,272. Commercially available ionomer resins include, for example, copolymers of ethylene and methacrylic or acrylic acid, neutralized with metal salts. Examples of commercially available ionomer resins include, but are not limited to, SURLYN® from DuPont de Nemours and Company, and ESCOR® and IOTEK® from Exxon Corporation. These ionomer resins are distinguished by the type of metal ion, the amount of acid, and the degree of neutralization.

U.S. Pat. Nos. 3,454,280, 3,819,768, 4,323,247, 4,526,375, 4,884,814, and 4,911,451 all relate to the use of SURLYN®-type compositions in golf ball covers. However, while SURLYN® covered golf balls, as described in the preceding patents, possess virtually cut-proof covers, the spin and feel are inferior compared to balata covered balls.

Polyurethanes have also been recognized as useful materials for golf ball covers since about 1960. U.S. Pat. No. 3,147,324 is directed to a method of making a golf ball having a polyurethane cover. The resulting golf balls are durable, while at the same time maintaining the "feel" of a balata ball. Various companies have investigated the usefulness of polyurethane as a golf ball cover material. U.S. Pat. No. 4,123,061 teaches a golf ball made from a polyurethane prepolymer formed of polyether with diisocyanate that is cured with either a polyol or an amine-type curing agent. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a glycol.

Unlike SURLYN® covered golf balls, polyurethane golf ball covers can be formulated to possess the soft "feel" of balata covered golf balls. However, golf ball covers made from polyurethane have not, to date, fully matched SURLYN® golf balls with respect to resilience or the rebound of the golf ball cover, which is a function of the initial velocity of a golf ball after impact with a golf club.

Furthermore, because the polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. The application of a uniform white pigmented coat to the dimpled surface of the golf ball is a difficult process that adds time and costs to the manufacture of a golf ball.

In addition, while certain polyols provide more stability to the polyurethane polymer in terms of moisture resistance, polyurethanes remain highly susceptible to changes in their physical properties due to absorption of moisture. To avoid moisture absorption, manufacturers have attempted to use moisture barrier layers, e.g., U.S. Pat. No. 5,820,488, located between the core and the cover. However, there still remains a need for materials that are resistant to absorption of moisture suitable for forming a golf ball component.

Polyureas have also been proposed as cover materials for golf balls. For instance, U.S. Pat. No. 5,484,870 discloses a polyurea composition comprising the reaction product of an organic isocyanate and an organic amine, each having at least two functional groups. Once these two ingredients are combined, the polyurea is formed, and thus the ability to vary the physical properties of the composition is limited. Like polyurethanes, conventional polyureas are not completely comparable to SURLYN® golf balls with respect to resilience or the rebound or damping behavior of the golf ball cover.

Therefore, there remains a continuing need for golf equipment having soft components that provide improved resilience, increased cut, scratch and abrasion resistance, moisture resistance, and enhanced adherence without adversely affecting overall performance characteristics of the golf balls. Thus, it would be advantageous to provide a composition that combines the cut and scratch resistance with improved resistance to discoloration and moisture that are suitable for forming golf ball components and other golf-related equipment.

SUMMARY OF THE INVENTION

The present invention relates to a golf ball comprising a core and a cover, wherein the cover includes a composition including: a prepolymer including the reaction product of an isocyanate-containing component and an amine-terminated component, wherein the amine-terminated component includes a copolymer of polytetramethylene ether glycol and polypropylene glycol including at least one terminal amino group; and an amine-terminated curing agent. In this aspect of the invention the prepolymer may includes about 4 percent to about 9 percent NCO groups by weight of the prepolymer.

In one embodiment, the at least one terminal amino group includes secondary amines. In another embodiment, the at least one terminal amino group includes a terminal secondary amino group at both ends of the copolymer. In yet another embodiment, the amine-terminated curing agent includes a secondary diamine.

The golf ball may further includes a layer disposed between the core and the cover. In one embodiment, this the layer includes a thermoplastic material.

The present invention also relates to a golf ball including a core and a cover, wherein the cover is cast from a polyurea composition including: a prepolymer formed from the reaction product of an isocyanate-containing compound and an isocyanate-reactive compound, wherein the isocyanate-reactive compound includes polytetramethylene ether glycol homopolymer having a molecular weight of about 1800 to about 2200 and terminal secondary amino groups; and an amine-terminated curing agent.

In one embodiment, the composition consists essentially of the following linkages:

wherein x is about 1 or greater, and R and $R_1$ include a straight chain or branched hydrocarbon chain having about 1 to about 20 carbons.

In another embodiment, the golf ball further includes a casing layer disposed between the core and the cover including a thermoplastic material. The thermoplastic material may include an ionomer resin.

In this aspect of the invention, the prepolymer may include about 6 percent to about 8 percent NCO groups by weight of the prepolymer. In addition, the polytetramethylene ether glycol homopolymer may have a molecular weight of about 1900 to about 2100. In one embodiment, the amine-terminated curing agent includes a secondary diamine.

The present invention is also directed to a golf ball including a core, a casing layer disposed about the core, and a cover cast about the casing layer, wherein the cover includes a composition including: a prepolymer including: an isocyanate; and an amine-terminated component, wherein the amine-terminated component includes a copolymer of polytetramethylene ether glycol and a polyalkylene glycol endcapped with amino groups; and an amine-terminated curing agent.

In one embodiment, the polyalkylene glycol includes polypropylene glycol, polyethylene glycol, and copolymers or mixtures thereof. In another embodiment, the amino groups include secondary amino groups.

The amine-terminated curing agent may include an amine-terminated polytetramethylene ether glycol. In one embodiment, the amine-terminated polytetramethylene ether glycol includes at least one terminal secondary amino group.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

The present invention contemplates compositions for use in golf balls. In particular, the compositions of the invention include polyurea compositions formed with at least one amine-terminated polytetramethylene ether glycol component and/or at least one amine-terminated copolymer of polytetramethylene ether glycol and polypropylene glycol as the isocyanate-reactive component in the prepolymer or as the curing agent. The compositions of the invention, which have enhanced shear and cut resistance and improved coefficient of restitution, may be used in a variety of golf ball constructions, i.e., one-piece, two-piece, or multilayer balls.

As such, use of the compositions of the invention enables the production of various golf ball constructions with physical and aerodynamic properties better than or equal to golf balls incorporating polyurea or polyurethane compositions without at least one amine-terminated polytetramethylene ether glycol component or at least one amine-terminated copolymer of polytetramethylene ether glycol and polypropylene glycol. Furthermore, because conventional polyurethane and polyurea elastomers are prone to absorption of moisture, the present invention provides novel compositions to improve the water resistance of golf equipment compositions. For example, the polyurea compositions of the present invention provide hydrophobicity, in addition to resiliency and durability.

Thus, golf balls formed from the compositions of the present invention demonstrate a distinct benefit to both professional and amateur golfers by providing a variety of golf ball constructions with improved durability and performance characteristics independent of skill level.

The Compositions of the Invention

Polyurea compositions, which are distinctly different from polyurethane compositions, result in desirable aerodynamic and aesthetic characteristics when used in golf equipment and ball components. Conventional aromatic polyurethane/urethane elastomers and polyurethane/urea elastomers are generally prepared by curing a prepolymer of diisocyanate and long chain polyol with at least one diol curing agent or at least one diamine curing agent, respectively. In contrast, the use of a long chain amine-terminated compound to form a polyurea prepolymer has been shown to improve shear, cut, and resiliency, as well as adhesion to other components.

Without being bound to any particular theory, it has now been discovered that the use of an amine-terminated polytetramethylene ether glycol (PTMEG) and/or an amine-terminated copolymer of PTMEG and polypropylene glycol (PPG) in the prepolymer or as a curing agent provide enhanced shear, cut, and resiliency as compared to conventional polyurea elastomers. For example, the compositions of the invention have improved durability and performance characteristics over that of a polyurea composition formed with amine-terminated PPG.

The polyurea-based compositions of this invention may be formed in several ways: a) from a prepolymer that is the reaction product of an isocyanate-containing component and amine-terminated PTMEG chain extended with a curing agent; b) from a prepolymer that is the reaction product of an isocyanate-containing component and an amine-terminated copolymer of PTMEG and PPG chain extended with a curing agent; c) from a prepolymer that is the reaction product of a polyurea-based prepolymer chain extended with an amine-terminated PTMEG; and d) from a prepolymer that is the reaction product of a polyurea-based prepolymer chain extended with an amine-terminated copolymer of PTMEG and PPG.

For example, the compositions of the invention may be prepared from at least one isocyanate-containing component, at least one amine-terminated copolymer of PTMEG and PPG, preferably a secondary diamine, and at least one amine-terminated curing agent, preferably a secondary aliphatic diamine or primary aromatic diamine curing agent. The presence of PTMEG in the backbone provides better shear resistance as compared to a backbone including only PPG.

The compositions of the invention may be formed of only saturated components, which have greater light stability, or may include one or more unsaturated components and a light stabilizer. The various components are discussed below.

Isocyanate-Containing Component

Any isocyanate available to one of ordinary skill in the art is suitable for use as the isocyanate-containing component according to the invention. Isocyanates for use with the present invention include aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylxylene diisocyanate (TMXDI).

The isocyanate-containing component may be organic polyisocyanate-terminated prepolymers, low free isocyanate prepolymer, and mixtures thereof. The isocyanate-containing component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. As used herein, the term "about" is used in connection with one or more numbers or numerical ranges, should be understood to refer to all such numbers, including all numbers in a range. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4',4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI), HDI dimer, HDI trimer, HDI biurets, and mixtures thereof; octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; trans-cyclohexane diisocyanate (CHDI); methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); isocyanurate trimer of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; uretdione dimer of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

When forming a saturated composition, the following saturated isocyanates are preferably used: ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; trans-cyclohexane diisocyanate (CHDI); methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H$_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); isocyanurate trimer of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, uretdione dimer of any polyisocyanate, such as uretdione of toluene diisocyanate, uretdione of hexamethylene diisocyanate, and mixtures thereof, a modified polyisocyanate derived from the above isocyanates and polyisocyanates; and mixtures thereof. In addition, the aromatic aliphatic isocyanates may be mixed with any of the saturated isocyanates listed above for the purposes of this invention.

In one embodiment, the isocyanate-containing component is selected from the group consisting of monomers, dimers, trimers, or higher "mers" of HDI, MDI, H$_{12}$MDI, IPDI, PPDI, CHDI, TDI, and mixtures thereof. For example, the isocyanate-containing component may be trans-cyclohexane isocyanate, which has the following general formula:

Amine-Terminated Component

In conventional polyurea systems, an isocyanate-containing component is typically reacted with an amine-terminated component to form a prepolymer that contains urea linkages. In the present invention, the isocyanate-containing component may be reacted with at least one amine-terminated PTMEG homopolymer, at least one amine-terminated copolymer of PTMEG and PPG, at least one amine-terminated copolymer of PTMEG and a polyalkylene glycol, or a combination thereof, to form a prepolymer according to the present invention. For the purposes of this invention, the term "amine-terminated PTMEG component" is intended to encompass an amine-terminated PTMEG homopolymer, an amine-terminated PTMEG/PPG copolymer, an amine-terminated PTMEG/polyalkylene glycol copolymer, and variations thereof. Each of these isocyanate-reactive components is discussed in greater detail below.

Those of ordinary skill in the art would be aware of various methods to produce PTMEG, which is essentially a downstream derivative of 1,4-butanediol. For example, PTMEG may be synthesized by the polymerization of tetrahydrofuran to yield a linear, saturated, primary polyetherol that is strictly difunctional. In one embodiment, PTMEG is a homopolymer with the following general formula:

The molecular weight of the PTMEG homopolymer may range from about 500 to about 3000. As known to those of ordinary skill in the art, differences in the molecular weight of the PTMEG homopolymer can influence hardness and elongation of the final polymer. In one embodiment, the PTMEG homopolymer has a molecular weight of about 600 to about 4000. For example, the PTMEG homopolymer may have a molecular weight of about 1800 to about 2200, preferably about 1950 to about 2050, and, in one embodiment, about 2000. In another embodiment, the molecular weight of the PTMEG homopolymer ranges from about 625 to about 675.

In yet another embodiment, the molecular weight of the PTMEG homopolymer is about 950 to about 1050. In still another embodiment, the molecular weight of the PTMEG homopolymer is about 1950 to about 2050. In yet another embodiment, the PTMEG homopolymer has a molecular weight of about 1000 to about 2000, preferably about 1200 to about 1600, and more preferably about 1300 to about 1400.

PTMEG is also available commercially. For example, BASF Corporation of New Jersey produces PTMEG under the trade names PolyTHF® Polyether Diol 1000, PolyTHF® Polyether Diol 2000, and PolyTHF® Polyether Diol 650. Invista and Lyondell are also sources of PTMEG under the trade names Terethane® and Polymeg®, respectively.

In this aspect of the invention, PTMEG has at least one terminal amino group. The at least one amino group is preferably secondary, however, the present invention contemplates the use of primary amino groups ($R_1$—$NH_2$), secondary amino groups ($R_1$—$NHR_2$), tertiary amino groups ($R_1$—$NR_2R_3$), or mixtures thereof. In one embodiment, the amino group(s) is a secondary amine. In another embodiment, the terminal amino group(s) is a primary amine. However, because of the rapid reaction of many primary amines with isocyanates, e.g., unhindered primary diamines, secondary amine may provide a more controllable reaction rate for use in forming the prepolymer. In fact, without being bound to any particular theory, it is believed that an amine with a high level of stearic hindrance, e.g., a tertiary butyl group on the nitrogen atom, has a slower reaction rate than an amine with no hindrance or a low level of hindrance.

When PTMEG is terminated at both ends with an amino group, in one embodiment, both amino groups are secondary amines. In another embodiment, both terminal amino groups are primary amines. In still another embodiment, PTMEG may be terminated at one end with a primary amine and at the other end with a secondary amine.

In another aspect of the invention, PTMEG may be copolymerized or endcapped with PPG to form a copolymer prior to the amine-termination. Any suitable PPG may be used in this aspect of the invention. For example, as known to those of ordinary skill in the art, because PPG is produced by anionic ring-opening polymerization of propylene oxide (PO), it can be manufactured by the catalyzed addition of propylene oxide to an active hydrogen-containing compound, i.e., an initiator. Suitable initiators include, but are not limited to, water, glycols, such as propylene glycol and ethylene glycol, bisphenol A, glycerin, primary monoamines, and mixtures thereof. When the initiator is ethylene glycol or water, the polymer is linear. A multifunctional initiator like glycerin, pentaerythritol or sorbitol causes the polymer branches out. As such, varying structures, chain lengths and molecular weights are theoretically possible depending on the specific initiator.

In one embodiment, propylene oxide and propylene glycol are reacted in the presence of a base catalyst, e.g., potassium hydroxide, at elevated temperature and pressure in an inert atmosphere. After the desired degree of polymerization has been achieved, the catalyst is neutralized and removed by filtration. As a result, in one embodiment, PPG has the following general formula:

The PPG used in the copolymer preferably has at least two terminal hydroxy groups. In another embodiment, PPG has three terminal hydroxy groups.

The molecular weight may range from about 200 to about 4000. In one embodiment, the molecular weight is about 500 to about 3500. In another embodiment, the molecular weight of PPG is about 1000 to about 2000. In still another embodiment, the PPG polymer has a molecular weight of about 250 to about 1200. In yet another embodiment, the molecular weight of the PPG polymer is about 2000 to about 3000.

One commercially available source of PPG is The Dow Chemical Company. In particular, Dow P-series polyglycols are linear polymers containing two terminal hydroxyl groups and the PT-series polyglycols are glyceryl ether polymers containing three terminal hydroxy groups.

The PTMEG/PPG copolymer may have a molecular weight ranging from about 500 to about 2500. In one embodiment, the copolymer has a molecular weight of about 800 to about 1600. In another embodiment, the molecular weight of the copolymer is about 1000 to about 1500. For example, the molecular weight of the copolymer may be about 1000 to about 1400.

Like the PTMEG homopolymer, the copolymer of PTMEG and PPG may have at least one terminal amino group. The at least one amino group is preferably secondary, however, the present invention contemplates the use of primary amino groups ($R_1$—$NH_2$), secondary amino groups ($R_1$—$NHR_2$), tertiary amino groups ($R_1$—$NR_2R_3$), or mixtures thereof. In one embodiment, the amino group(s) is a secondary amine. In another embodiment, the terminal amino group(s) is a primary amine.

When the PTMEG/PPG copolymer is terminated at both ends with an amino group, in one embodiment, both amino groups are secondary amines. In another embodiment, both terminal amino groups are primary amines. In still another embodiment, PTMEG may be terminated at one end with a primary amine and at the other end with a secondary amine.

Similarly, PTMEG may be copolymerized with other polyalkylene glycols, i.e., polymers contain repeating alkylene oxide units. For example, instead of using propylene oxide as the cyclic ether, other cyclic ethers may be selected such as ethylene oxide, combinations of ethylene oxide and propylene oxide, tetrahydrofuran, and the like. For example, in one embodiment, a copolymer of PTMEG and polyethylene oxide has at least one terminal amino group.

In addition, when the amine-terminated PTMEG component is used as the curing agent instead of the prepolymer, any amine-terminated component that reacts with the isocyanate-containing component available to one of ordinary skill in the art is suitable for use as the isocyanate-reactive component to form the polyurea prepolymer. For example, in this aspect of the invention, the isocyanate-reactive component may include amine-terminated hydrocarbons, amine-terminated polyethers, amine-terminated polyesters, amine-terminated polycarbonates, amine-terminated polycaprolactones, and mixtures thereof. The amine-terminated segments may be in the form of a primary amine ($NH_2$) or a secondary amine (NHR). Suitable examples of such isocyanate-reactive components useful in forming the polyurea prepolymer according to this aspect of the invention are disclosed in U.S. Patent Publication No. 2007/0197724.

The molecular weight of the isocyanate-reactive component for use in this aspect of the invention may range from about 100 to about 10,000. In one embodiment, the isocyanate-reactive component is about 500 or greater, preferably about 1000 or greater, and even more preferably about 2000 or greater. In another embodiment, the isocyanate-reactive component molecular weight is about 8000 or less, preferably about 4,000 or less, and more preferably about 3,000 or less.

For example, in one embodiment, the molecular weight of the isocyanate-reactive component is about 1000 to about 4000.

Amine-terminated polyamides may also be suitable as the isocyanate-reactive component to form the polyurea prepolymer component of the present invention. Suitable amine-terminated polyamides include, but are not limited to, those having following structures:

where x is the number of repeat units, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group.

Additional amine-terminated compounds may also be useful as an isocyanate-reactive component in forming the polyurea prepolymers of the present invention include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly(propylene glycol) bis(2-aminopropyl ether) having an average molecular weight of about 200 to about 5,000; polytetrahydrofuran bis (3-aminopropyl) terminated compound having an average molecular weight of about 200 to about 2000; and mixtures thereof, all of which are available from Aldrich of Milwaukee, Wis.

Any of the isocyanate-reactive components discussed above may be used in a blend with the amine-terminated PTMEG component in an effort to further control the reaction rate and physical properties of the polyurea prepolymer and resulting polyurea composition.

Curing Agent

The curing agent may be any of the amine-terminated PTMEG components discussed above. In the alternative, the curing agent may be a number of other amine-terminated components. In particular, the curing agent may be a single amine-terminated component or a blend of amine-terminated components and may include one or more saturated, unsaturated, aromatic, and cyclic groups. Additionally, the amine-terminated curatives may include one or more halogen groups.

As known to those of ordinary skill in the art, however, the use of an amine-terminated component as the curing agent with a polyurea prepolymer ultimately results in a composition that includes only urea linkages and no urethane linkages because the excess isocyanate in the polyurea prepolymer reacts with the amine groups in the curing agent to form more urea linkages. Thus, the compositions of the invention are pure polyurea, i.e., the linkages therein have the following general structure:

where x is the number of repeat units, i.e., about 1 or greater, and R and $R_1$ are straight chain or branched hydrocarbon chain having about 1 to about 20 carbons.

As such, when the curing agent is not an amine-terminated PTMEG component, suitable amine-terminated curing agents include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine), isomers, and mixtures thereof; diethylene glycol bis-(aminopropyl)ether; 2-methylpentamethylene-diamine; diaminocyclohexane, isomers, and mixtures thereof; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine; diisopropanolamine; isophoronediamine; 4,4-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 3,5-diethyltoluene-2,4-diamine; 3,5-diethyltoluene-2,6diamine; 4,4-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof. In one embodiment, the amine-terminated curing agent is 4,4'-bis-(sec-butylamino)-dicyclohexylmethane. In one embodiment, the amine-terminated curing agent may have a molecular weight of about 64 or greater. In another embodiment, the molecular weight of the amine-curing agent is about 2000 or less. In addition, any of the amine-terminated moieties listed above may be used as curing agents to react with the prepolymers.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine and mixtures thereof.

In one embodiment, the curatives used with the prepolymer include major isomers of diethyltoluenediamine (DETDA) including 3,5-diethyltoluene-2,4-diamine and 3,5-diethyltoluene-2,6-diamine (commercially available as Ethacure® 100-LC) from Albemarle Corporation), 3,5-dimethylthio-2,4-toluenediamine and 3,5-dimethyl-thio-2,6-toluenediamine (commercially available as Ethacure® 300 from Albemarle Corporation), 4,4'-bis-(sec-butylamino)-diphenylmethane, 4,4'-bis-(sec-butylamino)-dicyclohexylmethane, N,N'-diisopropyl-isophorone diamine (available from Huntsman Corporation under the tradename Jefflink), polyoxypropylene diamine; propylene oxide-based triamine; 3,3'-dimethyl-4,4'-diaminocyclohexylmethane; and mixtures thereof.

For example, 4,4'-bis-(sec-butylamino)-dicyclohexylmethane may be suitable for use in combination with an isocyanate to form the polyurea prepolymer. In addition, N,N'-diisopropyl-isophorone diamine, may be used as the secondary diamine curing agent.

To further improve the shear resistance of the resulting polyurea elastomers, a multi-functional curing agent can be used to help improve cross-linking. Preferably, a triol such as trimethylolpropane or a tetraol such as N,N,N',N'-tetrakis (2-hydroxylpropyl)ethylenediamine may be added to the formulations. Other useful triamine curing agents for improving the crosslinking of polyurea elastomers include, but are not limited to: propylene oxide-based triamines; trimethylolpropane-based triamines; glycerin-based triamines; N,N-bis {2-[(aminocarbonyl)amino]ethyl}-urea; N,N',N''-tris(2-aminoethyl)-methanetriamine; N1-(5-aminopentyl)-1,2,6-hexanetriamine; 1,1,2-ethanetriamine; N,N',N''-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl)amino]butyl]amino]propyl}-1,2,6-hexanetriamine; di-9-octadecenyl-(Z,Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl)amino]butyl]amino]propyl}-1,2,6-hexanetriamine; N1-{4-[(3-aminopropyl)amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6,11-trimethyl-2,6,11-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl) 1,2-propanediamine; 1,2,3-propanetriamine; 2-methyl-1,2,3-propanetriamine; and mixtures thereof.

In one embodiment, the curing agent is a modified curative blend as disclosed in co-pending U.S. Patent Publication No. 2003/0212240, which is incorporated by reference herein in its entirety. For example, the curing agent of the invention may be modified with a freezing point depressing agent to create a curative blend with a slower onset of solidification and with storage stable pigment dispersion. A number of amine-terminated curing agents have relatively high freezing points, e.g., hexamethylene diamine (105.8° F.), diethanolamine (82.4° F.), triethanol amine (69.8° F.), diisopropanolamine (73.4° F.), and triisopropanolamine (111.2° F.). Such amine-terminated curing agents may be modified with an amine-terminated freezing point depressing agent or a mixture of amine-terminated freezing point depressing agents. Suitable amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and mixtures thereof.

The freezing point depressing agent is preferably added in an amount sufficient to reduce the freezing point of the curing agent by a suitable amount to prevent loss of pigment dispersion, but not affect the physical properties of the golf ball. In one embodiment, the freezing point depressing agent is added to the curing agent in an amount of about 5 percent or greater by weight of the curative blend, i.e., curing agent(s), freezing point depressing agent. In another embodiment, the freezing point depressing agent is present in an amount of about 8 percent greater by weight of the curative blend. In still another embodiment, the freezing point depressing agent is present in an amount of about 10 percent or greater. In yet another embodiment, the curative blend includes the freezing point depressing agent in an amount of about 12 percent or greater by weight of the curative blend. The curative blend may also include a freezing point depressing agent in an amount of about 14 percent or greater by weight of the curative blend.

In addition, after freezing and subsequent thawing, the modified curative blend of the present invention preferably has a pigment dispersion of greater than 0 on the Hegman scale, preferably about 1 or greater, and more preferably about 2 or greater. In one embodiment, the modified curative blend after a freeze/thaw cycle has a pigment dispersion of about 3 or greater on the Hegman scale. In another embodiment, the modified curative blend after a freeze and thaw is about 4 or greater on the Hegman scale, preferably about 5 or greater. In still another embodiment, the modified curative blend after a freeze and thaw is about 6 or greater on the Hegman scale. In yet another embodiment, the modified curative blend after freezing and thawing is about 7 or greater on the Hegman scale.

Forming the Composition

There are two basic techniques used to process the compositions of the invention: the one-shot technique and the prepolymer technique. The one-shot technique reacts the isocyanate-containing component, the isocyanate-reactive component, and the curing agent in one step, whereas the prepolymer technique requires a first reaction between the isocyanate-containing component and the isocyanate-reactive component to produce the prepolymer, and a subsequent reaction between the prepolymer and a curing agent to form a polyurea composition. Either method may be employed to produce the compositions of the invention, however, the prepolymer technique is preferred because it provides better control of chemical reaction and, consequently, results in more uniform properties for the elastomers.

When using the prepolymer method, the amount of NCO in the prepolymer preferably ranges from about 4 percent to about 9 percent by weight of the prepolymer. In one embodiment, the NCO content in the prepolymer is about 5 percent to about 8 percent. In another embodiment, the prepolymer has about 6 percent to about 8 percent NCO content. In still another embodiment, the NCO content in the prepolymer is about 6 percent to about 7 percent. In yet another embodiment, the NCO content in the prepolymer is from about 7 percent to about 8 percent.

Depending on the prepolymer to curative ratio, which is a function of the NCO content of the prepolymer and molecular weight of the curing agent, the castable polyurea-based or polyurethane-based compositions of the invention may be thermoset or thermoplastic in nature. For example, castable thermoplastic compositions of the invention include linear polymers and are typically formed curing the prepolymer with a diol or secondary diamine with 1:1 stoichiometry in the absence of moisture. Thermoset compositions of the invention, on the other hand, are cross-linked polymers and are typically produced when the prepolymer to curative ratio is less than about 1. For example, the composition may be thermoset polyurea when the prepolymer to curing agent ratio is 1:0.95.

In addition, skilled artisans are aware that the various properties of the golf ball and golf ball components, e.g., hardness, may be controlled by adjusting the prepolymer-curative ratio. The ratio of prepolymer to curing agent for the purposes of this invention is preferably from about 0.5:1 to about 16:1.

Because the prepolymer-curative ratio determines whether a composition of the invention will be thermoplastic or thermoset, the method of molding the compositions of the invention onto the ball also will vary depending on the composition. For example, casting may be preferred when the material is thermoset, whereas compression molding or injection molding may be preferred for thermoplastic compositions. In addition, both the thermoplastic and thermoset polyurea compositions of the present invention also may be formed around the core using reaction injection molding (RIM) and liquid injection molding (LIM) techniques.

The material hardness of the compositions of the invention may range from about 35 Shore D to about 55 Shore D. In one embodiment, the composition has a material hardness of about 40 Shore D to about 50 Shore D. In another embodiment, the material hardness of the composition is about 40 Shore D to about 52 Shore D. In yet another embodiment, the material hardness of the composition is about 40 Shore D to about 45 Shore D.

Composition Additives

Additional materials conventionally included in polyurethane and polyurea compositions may be added to the polyurea prepolymers or composite compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

Reaction Rate Modifiers

While not necessary to form a polyurea composition, a catalyst may also be employed to promote the reaction between the prepolymer and the curing agent. In the alternative, additives to slow down the reaction rate are contemplated by the inventors.

Suitable catalysts include, but are not limited to bismuth catalyst; zinc octoate; stannous octoate; tin catalysts such as bis-butyltin dilaurate (DABCO® T-12 manufactured by Air Products and Chemicals, Inc.), bis-butyltin diacetate (DABCO® T-1); stannous octoate (DABCO® T-9); tin (II) chloride, tin (IV) chloride, bis-butyltin dimethoxide (FAS-CAT®-4211), dimethyl-bis[1-oxonedecyl)oxy] stannane (FORMEZ® UL-28), di-n-octyltin his-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT™ SA-1, POLYCAT™ SA-2, POLYCAT™, and the like; and mixtures thereof. In one embodiment, the catalyst is bis-butyltin dilaurate.

The catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as bis-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Density-Adjusting Filler(s)

Fillers may be added to the polyurea compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question.

Examples of useful fillers include zinc oxide, barium sulfate, calcium oxide, calcium carbonate, and silica, as well as other known corresponding salts and oxides thereof.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers

The compositions of the invention may include both saturated and unsaturated components. And, while the use of only saturated components aids in avoiding the yellowing over time that occurs with unsaturated components, the use of various UV absorbers and light stabilizers to any of the above compositions may help to also maintain the tensile strength, elongation, and color stability. The use of light stabilizing components also may assist in preventing cover surface fractures due to photo degradation. As such, the compositions of the invention may contain at least one light stabilizing component to prevent significant yellowing from unsaturated components contained therein.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

Composition Blends

The compositions of the invention preferably include from about 1 percent to about 100 percent of the polyurea polymer described above, however, the compositions may also be blended with other materials. In one embodiment, the composition contains about 10 percent to about 90 percent polyurea polymer, preferably from about 10 percent to about 75 percent polyurea polymer, and contains about 90 percent to 10 percent, more preferably from about 90 percent to about 25 percent other polymers and/or other materials as described below. Unless otherwise stated herein, all percentages are given in percent by weight of the total composition of the golf ball layer in question.

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

Golf Ball Layer Compositions and Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, intermediate layer, and/or cover of a golf ball, each of which may have a single layer or multiple layers. As used herein, the term "multilayer" means at least two layers.

Figure 1:
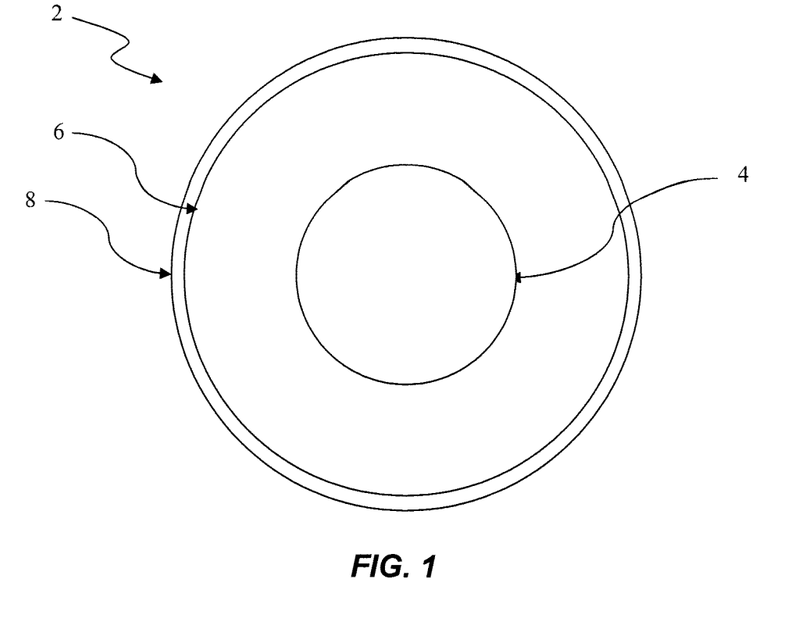
FIG. 1 is a cross-sectional view of a three-piece golf ball, wherein the cover is formed from a composition of the invention.

In one embodiment, the compositions of the invention are contemplated for use in an outer cover of a three-piece ball. For example, FIG. 1 illustrates a multilayer golf ball 2, including a core 4 and a dual cover construction including a thin casing layer 6 and an outer cover layer 8. The outer cover layer 8 is preferably formed of a composition of the invention, the core 4 is formed of polybutadiene reaction material, and the thin casing layer 6 is formed of a thermoplastic ionomeric material. The materials suitable for use in this particular construction, as well as other constructions and the materials used therein, are discussed below.

Golf Ball Core Layer(s)

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the compositions of the present invention may be incorporated into any component of a golf ball, including the core. For example, a core layer may contain a polyurea composition according to the invention.

In one embodiment, the core is formed of a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending U.S. Patent Publication No. 2003/0119989, the entire disclosure of which is incorporated by reference herein, may be used to form the reaction product. Although this polybutadiene reaction product is discussed in a section pertaining to core compositions, the present invention also contemplates the use of the reaction product to form at least a portion of any component of a golf ball.

As used herein, the terms core and center are generally used interchangeably to reference the innermost component of the ball. In some embodiments, however, the term "center" is used when there are multiple core layers, i.e., a center and an outer core layer.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from the polyurea compositions of the invention.

The intermediate layer(s) may also likewise include one or more homopolymeric or copolymeric materials, such as vinyl resins, such as those formed by the polymerization of vinyl chloride, or by the copolymerization of vinyl chloride with vinyl acetate, acrylic esters or vinylidene chloride; polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst; polyurethanes, such as those prepared from polyols and diisocyanates or polyisocyanates and those disclosed in U.S. Pat. No. 5,334,673; polyureas, such as those disclosed in U.S. Pat. No. 5,484,870; polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like; acrylic resins and blends of these resins with poly vinyl chloride, elastomers, and the like; thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Arkema, Inc. of Philadelphia, Pa.; polyphenylene oxide resins or blends of polyphenylene oxide with high impact polystyrene as sold under the trademark NORYL by SABIC Innovative Plastics of Pittsfield, Mass.; thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.; blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and blends of thermoplastic rubbers with polyethylene, polypropylene, polyacetal, nylon, polyesters, cellulose esters, and the like.

In one embodiment, the intermediate layer includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof. For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/non-ionomer blends are disclosed in co-pending U.S. Patent Publication No. 2003/0078348, the entire disclosure of which is incorporated by reference herein. Another example of a polyamide-nonionomer blend is a polyamide and non-ionic polymers produced using non-metallocene single-site catalysts. Examples of suitable single-site catalyzed polymers are disclosed in co-pending U.S. Pat. No. 6,476,130, of which the entire disclosure is incorporated by reference herein.

Golf Ball Cover(s)

The cover provides the interface between the ball and a club. Properties that are desirable for the cover are good moldability, high abrasion resistance, high impact resistance, high tear strength, high resilience, and good mold release, among others. As discussed above, the cover layer may be formed, at least in part, from the compositions of the invention. For example, a cover layer may be formed of a polyurea composition that is formed from a prepolymer that is the reaction product of an isocyanate-containing component and an amine-terminated PTMEG component, which is chain extended with an amine-terminated curing agent.

The cover layer(s) may also be formed from composition blends as discussed above. For example, in one embodiment, at least one cover layer is formed from a blend of about 10 percent to about 90 percent of the polyurea compositions and about 90 percent to about 10 percent other polymers and/or other materials.

When the compositions of the invention are not used in the cover layer, the cover may be formed from one or more homopolymeric or copolymeric materials as discussed in the section above pertaining to the intermediate layer. The cover may also be at least partially formed from the polybutadiene reaction product discussed above with respect to the core.

Ball Constructions

As described above, there are various constructions that are contemplated according to the present invention. In particular, the compositions of the invention may be included in an outer cover layer 8 of ball 2 as illustrated in FIG. 1. Likewise, this construction may be employed when both the outer cover layer 8 and the thin casing layer 6 are formed from compositions of the invention. For example, the thin casing layer 6 may be formed from a polyurea composition according to the invention where the amine-terminated PTMEG component, based on a PTMEG homopolymer with at least two terminal secondary amino groups, is used to form the prepolymer. The outer cover layer 8 may then be formed from a polyurea composition of the invention where the amine-terminated PTMEG component used to form the prepolymer is based on a secondary amine-terminated copolymer of PTMEG and PPG. The reverse scenario is also contemplated, i.e., where the outer cover layer 8 is formed using a PTMEG homopolymer with at least two terminal secondary amino groups and the thin casing layer 6 is formed using a secondary amine-terminated copolymer of PTMEG and PPG.

Figure 2:
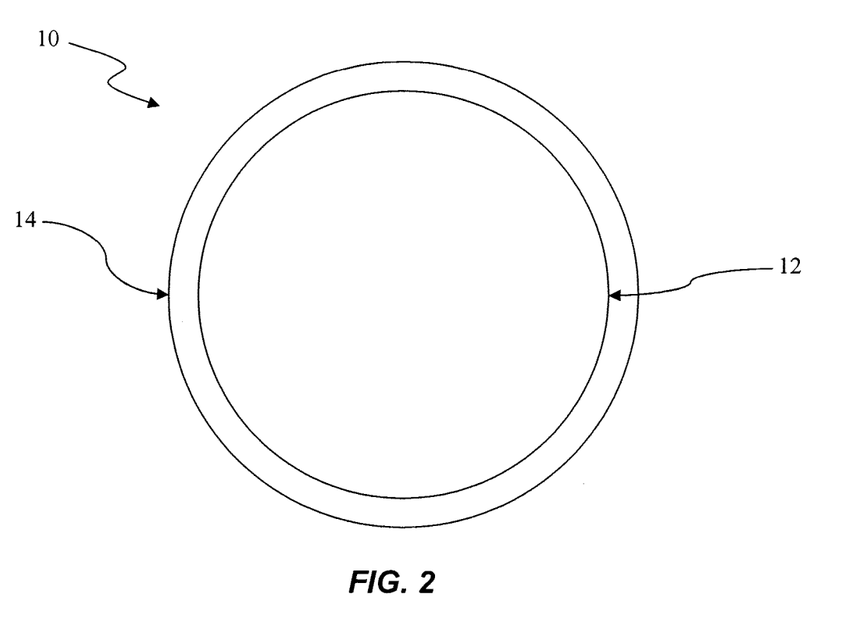
FIG. 2 is a cross-sectional view of a two-piece golf ball, wherein at least the cover is formed from a composition of the invention.

In addition, the compositions of the invention may be used to form an outer cover 14 of a two-piece golf ball 10 with a large core 12, as shown in FIG. 2. In this aspect of the invention, either of the core or cover or both may be formed of the compositions of the invention. For example, in one embodiment, the core 12 may formed of a polybutadiene reaction material or other conventional core materials and the outer cover 14 is formed of the compositions of the invention.

Figure 3:
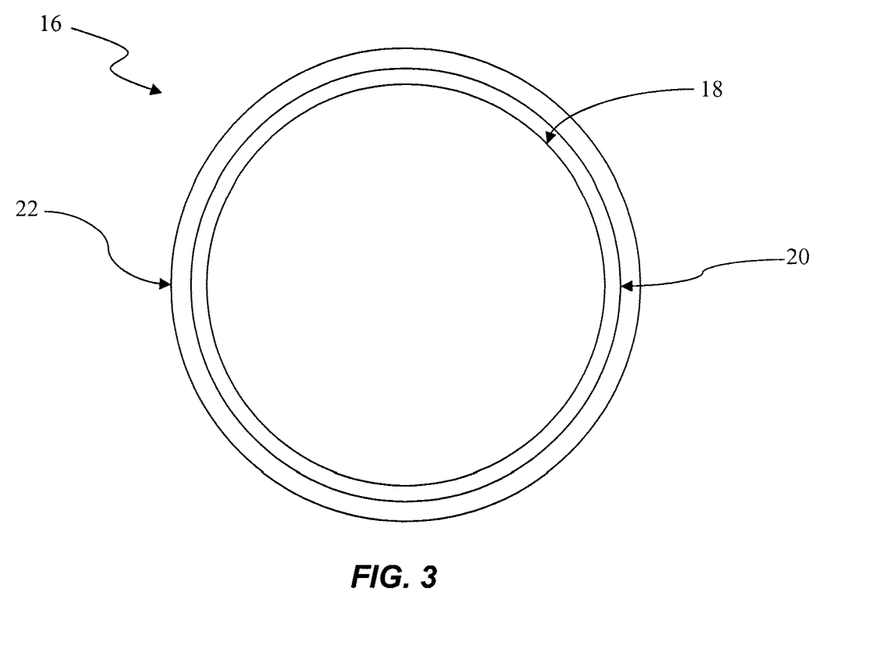
FIG. 3 is a cross-sectional view of a multi-component golf ball, wherein the cover is formed from a composition of the invention.

FIG. 2 illustrates a multilayer golf ball 11, including a cover 13, at least one intermediate layer 14, and a core 12. In one embodiment, the golf ball 11 of FIG. 2 may include a core 12 of polybutadiene reaction material, an intermediate layer 14, and a cover 13 formed of the polyurea-based composition of the invention. In addition, the golf ball 16 of FIG. 3 has a core 18, at least one intermediate layer 20, and cover 22. Any of the core 18, intermediate layer(s) 20, or cover 22 may be formed of the compositions of the invention. In one embodiment, the core 18 is formed of polybutadiene reaction material or other conventional core materials, the intermediate layer 20 is formed of an ionomeric material, and the cover 22 is formed of the compositions of the invention.

Figure 4:
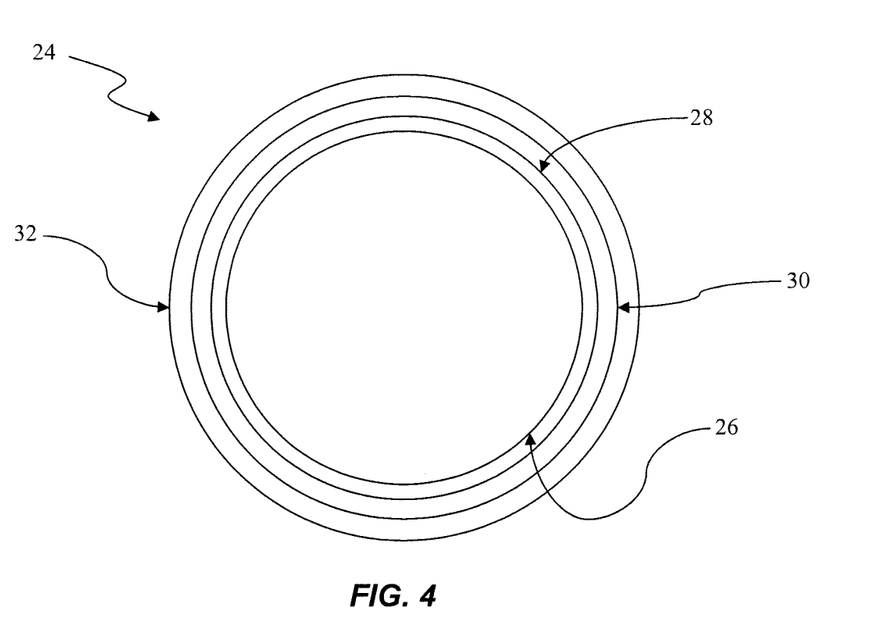
FIG. 4 is a cross-sectional view of a multi-component golf ball including a dual core and a dual cover, wherein the cover is formed from a composition of the invention.

The core and cover may include more than one layer. As an example, the golf ball 24 of FIG. 4 may include a center 26, an outer core layer 28, an inner cover layer 30, and an outer cover layer 32. The outer core layer may be a solid layer or a wound layer formed from a tensioned elastomeric material. In one embodiment, the golf ball 24 of FIG. 4 may have a center 26 and outer core layer 28 made of a polybutadiene reaction product, an inner cover layer 30 formed of an ionomeric material, and an outer cover layer 32 cast from the compositions of the invention.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Depending on the material, the various components of the golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. These and other manufacture methods are disclosed in U.S. Pat. Nos. 6,207,784 and 5,484,870, the disclosures of which are incorporated herein by reference in their entirety.

For example, when the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

The polyurea compositions of the invention may be applied over an inner ball using a variety of application techniques such as spraying, compression molding, dipping, spin coating, casting, or flow coating methods that are well known in the art. In one embodiment, the polyurea compositions of the invention are formed over an inner ball using a combination of casting and compression molding. In another embodiment, the composition of the invention is used as a cover that is cast about an inner ball. U.S. Pat. No. 5,733,428, the entire disclosure of which is hereby incorporated by reference, discloses a method for forming a polyurethane-based cover on a golf ball core. Because this method relates to forming a cover about an inner ball by mixing and introducing the material in mold halves where the exothermic reaction continues until the material is solidified about the inner ball, the polyurea compositions of the invention may also be formed into a layer about an inner ball employing the same casting process.

In particular, the prepolymer and curative may be mixed in a motorized mixer inside a mixing head by metering amounts of the curative and prepolymer through the feed lines. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. No. 5,006,297 and U.S. Pat. No. 5,334,673 both also disclose suitable molding techniques that may be utilized to apply the polyurea compositions of the invention. However, the method of the invention is not limited to the use of these techniques; other methods known to those skilled in the art may also be employed. For instance, other methods for holding the ball core may be utilized instead of using a partial vacuum.

Golf Ball Post-Processing

The golf balls of the present invention may be painted, coated, or surface treated for further benefits. For example, golf balls covers frequently contain a fluorescent material and/or a dye or pigment to achieve the desired color characteristics. A golf ball of the invention may also be treated with a base resin paint composition. In addition, the golf ball may be coated with a composition including a whitening agent.

In one embodiment, the golf balls of the invention may be UV cured. Suitable methods for UV curing are disclosed in U.S. Pat. Nos. 6,500,495, 6,248,804, and 6,099,415, the entire disclosures of which are incorporated by reference herein. In one embodiment, the top coat is UV curable. In another embodiment, the ink is UV curable and may be used as a paint layer or as a discrete marking tool for logos and indicias.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover. The golf balls of the invention may also be subjected to dye sublimation, wherein at least one golf ball component is subjected to at least one sublimating ink that migrates at a depth into the outer surface and forms an indicia, as disclosed in U.S. Patent Publication No. 2003/0106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Protective and decorative coating materials, as well as methods of applying such materials to the surface of a golf ball cover are well known in the golf ball art. Generally, such coating materials include urethanes, urethane hybrids, epoxies, polyesters and acrylics. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer is believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the outer cover has a thickness from about 0.02 inches to about 0.07 inches. In another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 30 Shore D or greater, preferably about 35 Shore D or greater, and more preferably about 40 Shore D or greater, as measured on the slab.

In another embodiment, the cover itself has a hardness of about 40 Shore D or greater. In particular, the cover may be from about 40 Shore D to about 70 Shore D. In one embodiment, the cover has a hardness of about 50 Shore D to about 65 Shore D, and in another embodiment, about 55 Shore to about 65 Shore D. In terms of Shore C, the cover may have a hardness of about 70 Shore C to about 90 Shore C, preferably about 75 Shore C to about 85 Shore C.

In this embodiment when the outer cover layer is softer than the intermediate layer or inner cover layer, the ratio of the Shore D hardness of the outer cover material to the intermediate layer material is about 0.97 or less, preferably about 0.95 or less, and more preferably about 0.92 or less. In another embodiment, the ratio is about 0.90 or less, preferably about 0.85 or less.

In another embodiment, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. Patent Publication No. 2003/0232666, the entire disclosure of which is incorporated by reference herein.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to about 100. In yet another embodiment, the compression of the golf balls of the invention is about 75 or greater and about 95 or less. For example, a preferred golf ball of the invention may have a compression from about 80 to about 95, preferably about 85 to about 93, and more preferably about 87 to about 91.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Flexural Modulus

Accordingly, it is preferable that the golf balls of the present invention have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Shear/Cut Resistance

The cut resistance of a golf ball cover may be determined using a shear test having a scale from 1 to 9 assessing damage and appearance. This test may be performed on molded balls prior to paint and also after paint. In one embodiment, the shear damage rank to a molded ball is preferably about 3 or less, more preferably about 2 or less. In another embodiment, the damage rank is about 1 or less.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Compositions of the Invention

Table 1 illustrates the components used to make polyurea compositions of the invention. Each prepolymer is the reaction product of an aliphatic polyisocyanate resin based on hexamethylene diisocyanate (Desmodur® N 3400 from Bayer Material Science) and an amine-terminated copolymer of PTMEG and PPG. The specific molecular weight of the amine-terminated copolymer of PTMEG and PPG and the NCO content of the prepolymer is provided in Table 1.

TABLE 1

Formulations According to the Invention

| Prepolymer | | Components | | | |
|---|---|---|---|---|---|
| Molecular Weight | NCO Content | #1 | #2 | #3 | #4 |
| 1000 | 6.09% | 1 eq. | | | |
| 1350 | 6.73% | | 1 eq. | | |
| 1000 | 8.09% | | | 1 eq. | |
| 1350 | 7.83% | | | | 1 eq. |
| Curing Agent* | | 0.95 eq. | 0.95 eq. | 0.95 eq. | 0.95 eq. |
| HCC-19584 Color Dispersion** | | | 4.5% | | |
| Material Hardness (Shore D) | | 40 | 44 | 51 | 49 |

*Curing Agent is diethyltoluene diamine available from Albemarle Corporation under the trade name Ethacure® 100-LC.
**HCC-19584 is a white-blue color dispersion manufactured by the PolyOne Corporation (formerly the Harwick Chemical Corporation)

As shown in Table 1 above, the higher NCO content in the prepolymer results in a higher material hardness in the resultant composition.

Example 2

Golf Balls Formed Using Compositions of the Invention

Golf balls were made having outer covers formulated from the compositions above. In particular, the golf ball construction includes a polybutadiene core having a diameter of 1.530 inches, an ionomeric casing layer having a thickness of 0.045 inches, and an outer cover layer having a thickness of 0.03 inches. A control ball was formed with the same construction with the outer cover layer formed of a urethane elastomer having a material hardness of 48 Shore D. The physical properties and the ball performance results are listed in Table 2.

TABLE 2

Physical Properties and Performance Results

|  | #1 | #2 | #3 | #4 | Control |
|---|---|---|---|---|---|
| Cover Hardness (Shore D/Shore C) | 58/77 | 59/79 | 61/83 | 61/84 | 60/82 |
| Pole/Equator Average | 1.687/ 1.682 | 1.684/ 1.679 | 1.686/ 1.679 | 1.686/ 1.679 | 1.681/ 1.683 |
| Compression | 88 | 87 | 91 | 89 | 89 |
| CoR @ 125 ft | 0.800 | 0.803 | 0.803 | 0.804 | 0.806 |
| Molded Ball Shear Damage* | 1.5 | 1 | 1.3 | 1.5 | 2.8 |
| Painted Ball Shear Damage* | 2.8 | 2.8 | 2.8 | 2.8 | 2.5 |

*Rating of Shear Test: Based on a scale of 1-9, 1 is the best, 9 is the worst.

As shown in Table 2, the golf balls that included covers formed of a composition of the invention have hardness, compression, and coefficient of restitution values comparable to the control ball. However, the shear damage on the molded balls of the invention was less than the control balls.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball including a core and a cover, wherein the cover includes a composition including:
   a prepolymer including the reaction product of an isocyanate-containing component and an amine-terminated component, wherein the amine-terminated component includes a copolymer of polytetramethylene ether glycol homopolymer and polypropylene glycol, wherein the copolymer comprises terminal amino groups, wherein the polypropylene glycol comprises three terminal hydroxy groups; and
   an amine-terminated curing agent comprising a copolymer of polytetramethylene ether glycol and polypropylene glycol.

2. The golf ball of claim 1, wherein the at least one terminal amino group includes secondary amines.

3. The golf ball of claim 1, wherein the terminal amino groups comprise secondary amines.

4. The golf ball of claim 1, wherein the prepolymer includes about 4 percent to about 9 percent NCO groups by weight of the prepolymer.

5. The golf ball of claim 1, wherein the amine-terminated curing agent includes a secondary diamine.

6. The golf ball of claim 1, wherein the golf ball further includes a layer disposed between the core and the cover.

7. The golf ball of claim 6, wherein the layer includes a thermoplastic material.

8. A golf ball including a core and a cover, wherein the cover is cast from a composition including:
   a prepolymer formed from the reaction product of an isocyanate-containing compound and an isocyanate-reactive compound, wherein the isocyanate-reactive compound includes a copolymer of polytetramethylene ether glycol homopolymer and polypropylene glycol, wherein the polypropylene glycol comprises three hydroxy groups, wherein the polytetramethylene ether glycol homopolymer has a molecular weight of about 1800 to about 2200, and wherein the copolymer comprises terminal secondary amino groups; and
   an amine-terminated curing agent comprising polytetramethylene ether glycol homopolymer.

9. The golf ball of claim 8, wherein the amine-terminated curing agent includes a secondary diamine.

10. The golf ball of claim 8, further including a casing layer disposed between the core and the cover including a thermoplastic material.

11. The golf ball of claim 10, wherein the thermoplastic material includes an ionomer resin.

12. The golf ball of claim 8, wherein the prepolymer includes about 6 percent to about 8 percent NCO groups by weight of the prepolymer.

13. The golf ball of claim 8, wherein the amine terminated curing agent has a molecular weight of about 1800 to about 2200 and terminal secondary amino groups.

* * * * *